United States Patent Office 3,195,172
Patented July 20, 1965

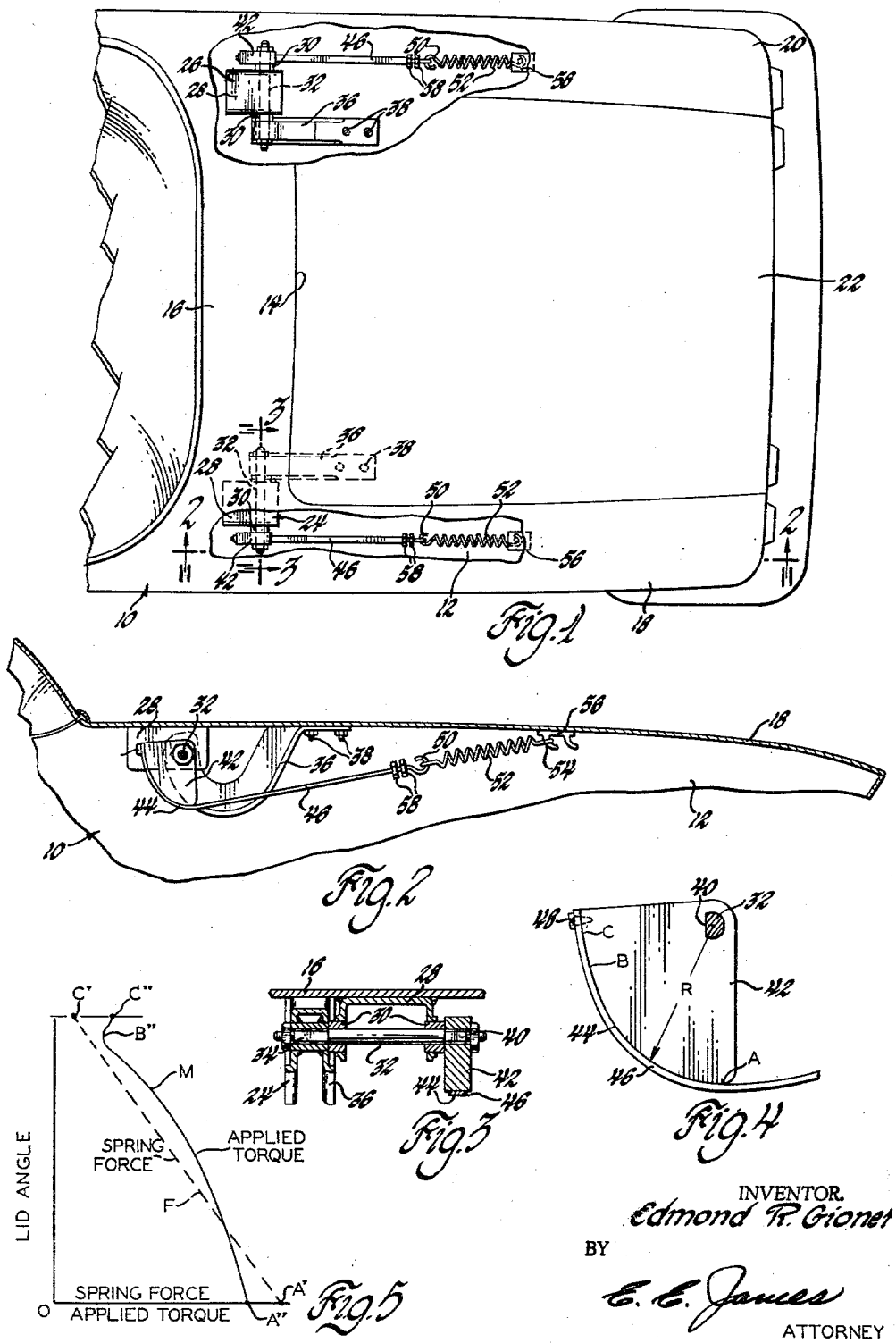

3,195,172
COUNTERBALANCING HINGE MECHANISM
Edmond R. Gionet, Warren, Mich., assignor to General Motors Corporation, Detroit, Mich., a corporation of Delaware
Filed Sept. 27, 1962, Ser. No. 226,674
6 Claims. (Cl. 16—128.1)

This invention relates generally to hinges and more particularly to hinges of a counterbalanced type suitable for use with a hood or deck lid closure member for an automotive vehicle compartment. Although not necessarily limited to such vehicle applications, the invention is herein shown and described with reference to such an operational environment for illustrative purposes.

The invention contemplates a concealed counterbalanced hinge mechanism having a minimum number of simple inexpensive components and mountable within a compartment similar to that indicated with minimal use or interference with useable compartment space. The invention further contemplates the use of a hinge operated cam and an extension spring to cooperatively provide the counterbalancing torque load required to assist and maintain effected opening of the closure member throughout its range of swinging movement between its normally closed position and a fully opened position resiliently detented and maintained by the biasing action of the spring and the geometry of the cam.

In the illustrative embodiment, two hinge supporting brackets are secured to the vehicle body laterally outwardly of the closure opening within the compartment. Gooseneck hinge straps mounted on opposite undercorners of the closure member are each drivingly secured to the inner ends of hinge pins suitably journaled in the adjacent brackets. The outer opposite ends of the two hinge pins each mount a cam drum sector in the incidental non-useable space defined between the adjacent fender and wheel housing panels. A separate flexible metal tape or strap is secured at one end to each cam drum for wrapping engagement therewith upon movement of the closure member toward its closed position. The other end of each flexible tape is secured to a helical extension spring. These springs are suitably secured at their distal ends to the vehicle body within the fender and wheel housing defined space in spaced relation to the aligned pivotal axes of the hinge pins. These extension springs are tensively preloaded to bias the pin and strap of their respective hinge mechanisms in a closure opening direction as applied through their connecting flexible tapes and cam members. Each cam member has a power sector or first cam surface tangentially engageable by the hinge strap and varied in radial dimension to modify the effective torque arm of the spring as applied to the corresponding hinge pin. Linear variation in deflective spring load or biasing force is thus modulated to vary the counterbalancing torque applied through the spaced hinges in accordance with the reduced torque load required as the closure member is moved toward its opened position. A second cam surface or ramp of limited arc on each cam member is tangentially coextensive with the first but of increasing radial dimension to a point adjacent the secured end of its respective flexible tape. This second ramp increases the effective torque arm of the cam as the closure member reaches its fully opened position to thereby insure maintenance of the closure member in its fully opened position by the counterbalance spring.

The foregoing and other objects, advantages and features of the invention will be apparent from the following detailed description of the illustrative embodiment having reference to the accompanying drawing, in which:

FIGURE 1 is a top elevational view of a portion of an automotive vehicle with portions broken away and shows a pair of hinge mechanisms constructed in accordance with the invention as installed to hinge and counterbalance the deck lid closure member for a compartment defined by the vehicle body;

FIGURE 2 is a somewhat enlarged sectional view taken substantially in the direction of the arrows and in the plane of the line indicated at 2—2 of FIGURE 1 and illustrates the counterbalanced hinge mechanism of the invention in lid-closed side elevation;

FIGURE 3 is an enlarged fragmentary sectional view of the hinge mechanism of FIGURE 2 taken substantially in the direction of the arrow and in the plane of the line indicated at 3—3 of FIGURE 1;

FIGURE 4 is a view corresponding to a portion of FIGURE 2 and enlarged to show the torque arm varying cam in greater detail and attachment of the spring biased flexible tape for winding engagement therewith; and FIGURE 5 is a graph illustrating the translation of the linear deflective change in spring loading as effected by cam-tape engagement to provide the non-linear torque load required to properly counterbalance and maintain the closure member through its range of opening movement.

Referring more particularly to FIGURES 1 and 2, a portion of an automotive vehicle body is generally indicated by the reference numeral 10. A compartment 12 is partially defined by the transverse tulip panel 16 and the longitudinally extending rear fender or quarter panels 18 and 20 of the outer body structure. This compartment is provided with an access opening outlined at 14 and may be used for the storage of a spare tire, tools, luggage, etc. The access opening 14 is closeable by a deck lid 22 hinged to the vehicle body for swinging opening movement upwardly and forwardly of the vehicle body by a laterally spaced pair of concealed counterbalancing hinge mechanisms 24 and 26 incorporating the invention. These hinge mechanisms are assembled of interchangeable components to provide hinges of opposite hand mountable substantially within the laterally opposite restricted compartment spaces which are partially defined by the rear quarter body panels. The following description of the hinge mechanism 24, with specific reference to FIGURES 2, 3 and 4, thus applies to both like reference numerals identifying corresponding components of both hinge mechanisms as shown in FIGURE 1.

Each hinge mechanism comprises a hinge supporting bracket member 28 of channeled section suitably secured to the underside of the tulip panel 16 slightly forward and outwardly of the adjacent corner of the closure opening 14. Two bushings 30 mounted in the side walls of this hinge bracket spacedly journal a hinge pin 32 aligned transversely of the vehicle with the corresponding pin of the hinge 26. Both ends of hinge pin 32 project from their bracket supported bushings. The pin end inwardly of the vehicle is drivingly secured at 34 for pivotal rotation with the pivot end of a swinging hinge strap 36 of conventional gooseneck configuration. The distal end of the gooseneck hinge member is suitably attached at 38 to the adjacent undercorner of the deck lid 22. Opening and closing movement of the deck lid 22 thus serves to rotate the pivot pin 32.

In accordance with the invention, a cam drum sector 42 is drivingly secured at 40 to the outer end of the deck lid driven hinge pin for rotation therewith in accordance with opening and closing movement of the hinge deck lid. The cam drum member is provided with a curved outer cam surface 44 which is varied in radial dimension with respect to the pivotal axis of the pivot pin 32. With lid closing movement this cam surface progressively and tangentially engages and enwraps a flexible tape or strap 46 having one end suitably secured at 48 to the cam member adjacent the end of its cam surface corresponding to a fully opened deck lid position. The end of the flexible strap distal from its attachment to the cam is connected at 50 to one end of a helical extension spring 52. The other end of the spring 52 is connected at 54 to an anchor member 56 suitably secured to the underside of the rear quarter fender panel 18 within the otherwise unuseable compartment space defined by the upper corner of the fender panel. The spring 52 thus acts through the flexible tape 46 and the variable lever arm R defined by its tangential engagement with the curved surface of the cam member to apply a torque moment to the hinge pin 32 tending to rotate the hinge strap 38 in a deck lid opening direction and counterbalancing the load of the deck lid. As shown in FIGURE 2, the anchor member 56 may be provided with several spring engaging hooks to provide for major lid load compensating adjustments in the tensive preloading of the spring 52. To effect minor changes in such spring loading, the spring connected end of the flexible tape may be provided with a threaded nut-locked adjusting means shown at 58.

As best seen in FIGURE 4, the curved cam surface of the cam member 42 has a first sector of reducing radial dimension between points A and B. This sector serves to reduce the effective moment arm of the spring 52 as the tape 46 is tangentially unwrapped therefrom with opening movement of the deck lid. As shown by the broken line curve A'–C' of FIGURE 5, substantially a straight-line linear variation occurs in the applied spring load due to a corresponding change in spring deflection effected by angular deck lid movement. In any given opened position of the deck lid, the resultant deflective spring loading acts through the effective arm of the cam member, corresponding to the radius at the point of cam surface tangency with the spring biased flexible strap, to provide the counterbalancing torque required to maintain the deck lid in its effected opened position up to the cam surface point B whereinafter the deck lid approaches its fully opened position. Such cam modulated deck lid counterbalancing torque is represented by the full line curve of FIGURE 5 between points A" and B".

As indicated above and shown in FIGURE 4, the cam member has a second sector B–C of limited arc adjacent the secured end of the flexible tape. This second sector is tangentially coextensive with the first sector but of increasing radial dimension between points B and C. As shown by the solid line curve portion B"–C" of FIGURE 5, this second cam sector provides a slight increase in the effective torque arm of the cam after the deck lid passes an opened position corresponding to the cam surface point B and approaches its fully opened position. The subsequent increase in the effective torque arm cooperates with the counterbalancing spring 52 to slightly overbalance and thereby carry the deck lid to a stop-limited fully opened position. The resultant overbalancing torque further serves to detent the deck lid in its fully opened position. By providing a limited initial cam surface ramp adjacent point A of reducing radial slope slightly greater than that shown in FIGURE 4, the cam 42 may be similarly used to apply an initial lid opening torque slightly in excess of that required to counterbalance and maintain the deck lid in its substantially horizontal closed or initially opened position.

From the foregoing decription, it will be seen that the illustrative embodiment of the invention provides a relatively simple means for accomplishing its several stated advantages and objectives and that various changes and departures might be made therein without departing from the spirit and scope of the invention as defined in the following claims.

I claim:

1. A hinge mechanism for a closure member swingable to close a vehicle body opening comprising a hinge pin journaled within the vehicle body extending parallel to one edge and laterally of an adjacent corner of the closure opening, a hinge member drivingly secured to the end of the hinge pin laterally inwardly of the adjacent corner of the body opening and mountable on the closure member for pivotal swinging movement about the journalled axis of the hinge pin between fully opened and closed positions of the closure member, cam means including a cam member drivingly secured to the hinge pin laterally outwardly of said body opening corner for pivotal rotation therewith and having an arcuate cam surface of varied radial dimension about the journalled axis of the hinge pin, spring means mounted within the vehicle body laterally outwardly of said body opening corner and operably connected through said cam member and hinge pin and tending to bias the closure hinge member in a closure opening direction, and said spring means including a flexible member connected to a reduced radius end of the cam surface and progressively engageable with increasing radial dimensioning of the cam surface during closing movement of the closure member and normally cooperating therewith during closure opening movement to modify the effective torque arm of the spring means to thereby vary the counterbalancing torque applied to the hinge pin and hinge member in accordance with that required to maintain the opened closure member between its closed and fully opened positions.

2. In a hinge mechanism as set forth in claim 1, the cam surface of said cam member having a first cam sector of decreasing radial dimension toward the connection of said flexible member with said cam member and progressively disengaged by the flexible member during closure opening movement to reduce the effective torque arm of said spring means as the closure member is moved between its closed and fully opened positions to thereby provide the counterbalancing torque required to maintain the closure member in any opened position intermediate its opened and closed positions.

3. In a hinge mechanism as set forth in claim 2, said cam member having a second cam sector of short arcuate dimension coextending from said first sector and cooperating with the flexible member to increase the effective torque arm of said spring means as the closure member approaches its fully opened position thereby causing said spring and cam means to apply a torque through said hinge pin sufficient to overbalance and carry the closure mountable hinge member to its fully opened closure supporting position thereby resiliently detenting the hinged closure member in its fully opened position.

4. In a hinge mechanism as set forth in claim 1, the cam surface of said cam member having a short end sector connected to and cooperating with the flexible member to provide a slight increase in the effective torque applied to the hinge member as the closure member approaches its fully opened position thereby tending to overbalance and resiliently detent the closure member in its fully opened position.

5. A counterbalanced hinge mechanism for mounting a closure member for swinging movement between opened and closed positions with respect to a vehicle body opening to a body defined compartment, said hinge mechanism comprising a first hinge support member mountable on the vehicle body within the body defined compartment adjacent a corner terminating one edge of the body defined compartment opening, a hinge pin journaled in and projecting laterally of said first hinge member and of the adjacent corner of the body opening and extending in parallel spaced relation to said one edge of the body opening, a second hinge member mountable on the inside of the closure member and secured on the adjacent projecting end of the hinge pin inwardly of the first hinge support members for swinging movement of the closure member between its opened and closed positions, a cam member secured on the other projecting end of the hinge pin for swinging movement with said closure mounting hinge member in a plane spaced laterally outwardly of said one edge and of the hinge support adjacent corner and having a curved cam surface thereon varying in radial dimension with respect to the pivotal axis of the hinge pin, flexible means secured at one end to said cam member for wrapping engagement with said cam surface upon movement of said closure member in a closing direction, spring anchoring means mountable on said vehicle body within the body defined compartment in spaced relation normal to the hinge pin and laterally adjacent the body opening in the swinging plane of the cam member, an extension spring tensively interposed between said spring anchoring means and the end of the flexible means remote from said cam member and prestressed to bias said flexible means to rotate said cam, hinge pin and strap in a closure opening direction, the curved cam surface of said cam member having a first sector decreasing in radial dimension with rotation of said cam member in a closure opening direction and cooperating with said flexible means to modify the effective torque arm of the spring biased flexible means on said cam member to compensate for the force reducing linear deflection of the extension spring thereby providing the counterbalancing torque normally required to maintain the opened closure member between its closed and fully opened positions, and said cam surface further having a second sector secured to said flexible means and extending from said first sector with increasing radial dimension away from said first sector and adapted to carry the secured end of said flexible means radially outwardly from the hinge pin axis as the second hinge member approaches its fully opened position thereby overbalancing and resiliently detenting the closure member in its fully opened position.

6. A hinge mechanism for a vehicle body having a closure member mountable for swinging movement between opened and closed positions relative to a compartment opening in the body, a hinge mechanism comprising a hinge support member mountable within the vehicle body adjacent one corner of the closure opening, a hinge pin having an intermediate portion journaled within said support member about an axis substantially normal to one side of the body opening extending from said one corner, the opposite ends of said pin projecting laterally of said one body opening side, a hinge strap mountable on the underside of the closure member and secured to the adjacent projecting end of the hinge pin for swinging movement of the closure member between its opened and closed positions, a cam member secured on the other end of the hinge pin outwardly of said one body opening side for swinging movement with the pin secured hinge strap and having a cam surface thereon of varying radial dimension with respect to the pivotal axis of the hinge pin, flexible spring means secured at one end to said cam members for wrapping engagement with said cam surface upon movement of the closure member in a closing direction, said spring means being secured at its opposite end to the vehicle body in the swinging plane of said cam member adjacent to said one body opening side and normally biasing said cam member in a closure opening direction, said cam member having a first sector of decreasing radial dimension to modify the effective torque arm of the spring means acting on the cam to thereby vary the counterbalancing torque applied as the closure member is moved between its closed and opened positions, and said cam member having a limited second sector of increased radial dimension carrying the secured end of said flexible spring means radially outwardly from said first sector to thereby increase the effective torque arm of said cam and thereby detent the closure member in its fully opened position.

References Cited by the Examiner
UNITED STATES PATENTS

| | | | |
|---|---|---|---|
| 1,721,308 | 7/29 | Lormor | 16—1 |
| 2,663,047 | 12/53 | Grenzeback | 16—1 X |
| 2,880,453 | 4/59 | Gessler | 16—190 |
| 2,902,710 | 9/59 | Gessler | 16—128.1 X |

DONLEY J. STOCKING, *Primary Examiner.*